Sept. 6, 1949.  D. W. FENTRESS  2,481,096
METHOD AND APPARATUS FOR MAKING BELLOWS
Filed March 9, 1944  2 Sheets-Sheet 1
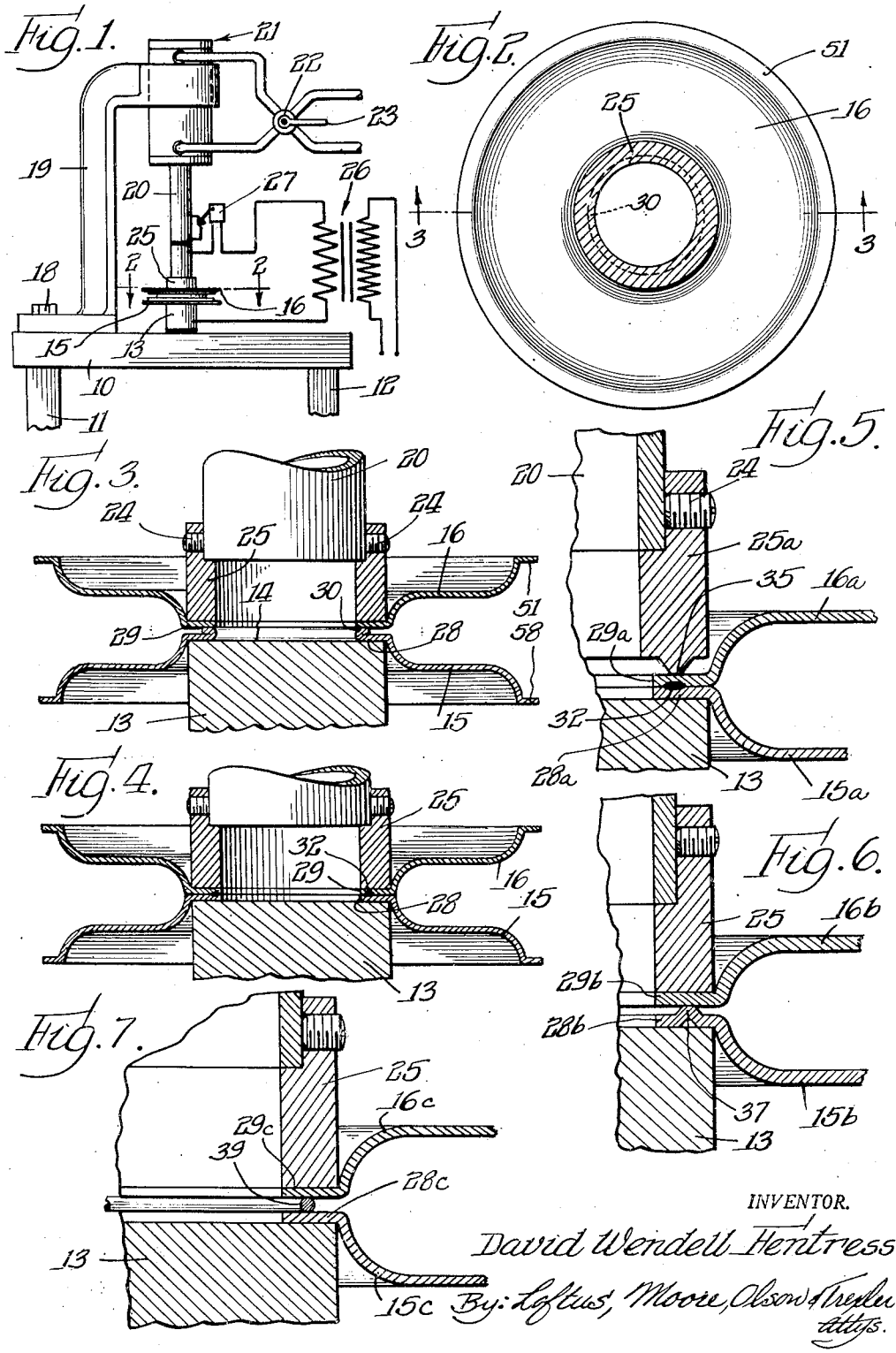
INVENTOR.
David Wendell Fentress
By: Loftus, Moore, Olson & Trexler
Attys.

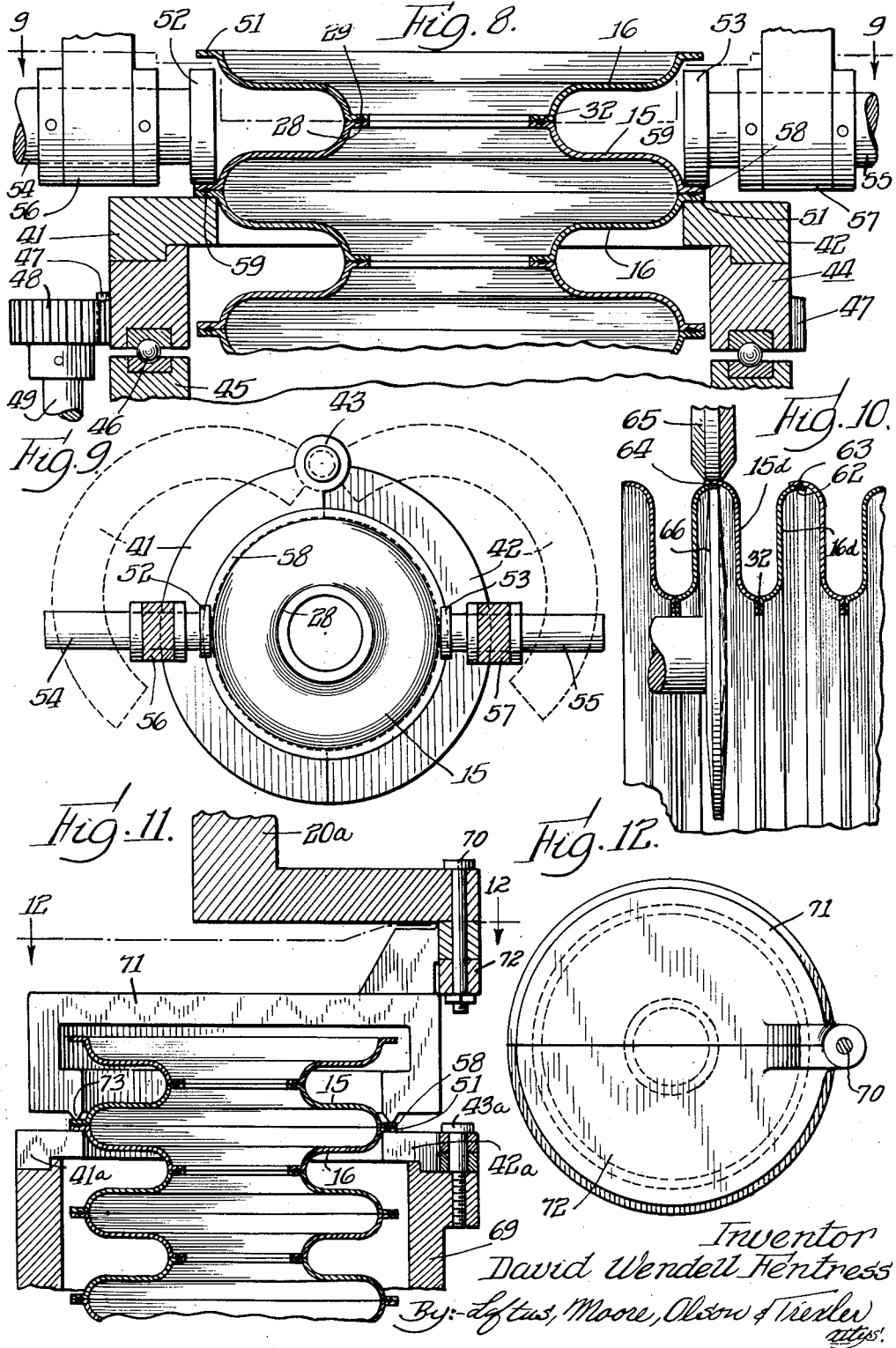

Patented Sept. 6, 1949

2,481,096

UNITED STATES PATENT OFFICE 2,481,096

METHOD AND APPARATUS FOR MAKING BELLOWS

David Wendell Fentress, Barrington, Ill., assignor to Chicago Metal Hose Corporation, Maywood, Ill., a corporation of Illinois Application March 9, 1944, Serial No. 525,640

9 Claims. (Cl. 219—4)

This invention relates to methods and apparatus for making bellows, particularly bellows of the superposed plate type.

It is an object of the invention to provide improved and more readily operable means and methods for making superposed plate bellows structures, of the type wherein the peripheral edges of the plates are secured together to provide the bellows structure.

More specifically stated, it is an object of the invention to provide means and methods for making bellows of the type stated, and for effecting welding of the peripheral plate edges, particularly in instances wherein the engaging surfaces of the plates are small, inaccessible, and otherwise difficult to work.

Another object of the invention is to enable the use of electric resistance welding in the making of superposed plate bellows, of various sizes including small sizes, whereby to provide a fluid-tight, more durable, and more satisfactorily operable bellows structure.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is an assembly view, diagrammatic in form, of a portion of a welding apparatus constructed in accordance with and adapted to employ the principles of the invention;

Fig. 2 is a horizontal sectional view of a portion of the structure of Fig. 1 on an enlarged scale, and taken as indicated by the line 2—2 of Fig. 1;

Fig. 3 is a vertical sectional view of the structure of Fig. 2 on a further enlarged scale, and taken as indicated by the line 3—3 of Fig. 2;

Fig. 4 is a view similar to Fig. 3, but illustrating the bellows plates after the welding operation;

Figs. 5, 6 and 7 are detail illustrative views, on a still further enlarged scale, respectively showing three different modified arrangements for effecting the welding operations of Figs. 3 and 4;

Fig. 8 is a partial view of a welding apparatus adapted to effect the welding of the outer peripheral edges of the bellows plates, after the inner peripheral plate edges have been welded as shown in Figs. 1–7;

Fig. 9 is a horizontal sectional view of the apparatus of Fig. 8, taken as indicated by the line 9—9 thereof, and shown on a reduced scale;

Fig. 10 is a partial illustrative view showing a modified arrangement for effecting the welding of the outer peripheral plate edges;

Fig. 11 is a partial view of a welding apparatus for effecting the welding of the outer peripheral plate edges in accordance with a modified method; and Fig. 12 is a horizontal sectional view of the apparatus of Fig. 11, on a reduced scale, and taken as indicated by the line 12—12 of Fig. 11.

The application is a continuation-in-part of my copending application, Serial No. 298,235, filed October 6, 1939, "Welding method and apparatus," and now issued as Patent No. 2,347,185, dated April 25, 1944.

In the manufacture of bellows of the superposed plate type, certain advantages result from the peripheral securing of the plate edges by welding such, for example, as insured fluid-tightness, increased durability and flexibility, and maintenance of the connection between the plates notwithstanding vibration, axial elongation and contraction of the bellows, varying pressure and other operating conditions encountered in service. My aforesaid copending application Serial No. 298,235 illustrates means and methods for effecting the manufacture of superposed plate bellows, including the welding of the peripheral plate edges to provide the bellows structure. The present invention also relates to the making of bellows of this type, and has particular reference to the securing or welding of the plate edges where the engaging plate surfaces are small, inaccessible, and difficult to work. For example, where the bellows is of small size, or where there is a wide difference between the outer and inner diameters of the plate peripheries as may in certain instances be necessary to provide the required degree of flexibility, the inner periphery or opening in the plates may be so small that extreme difficulty is encountered in effecting the welding thereof in a readily operable, expeditious and satisfactory manner. The present invention has for its object the provision of satisfactory means and methods for welding the peripheral plate edges, and particularly in installations and instances of the type referred to.

Referring more particularly to the drawings, in Figs. 1–7 means and methods are shown particularly adapted for the welding of the inner peripheral edges of the superposed bellows plates. Figs. 1–4 illustrate one form or arrangement, whereas Figs. 5, 6 and 7 show modified embodiments.

Referring first to Figs. 1–4, in Fig. 1 a welding apparatus is illustrated, somewhat diagrammatically, comprising a main base or table 10 suitably supported on legs 11 and 12. The table rigidly carries an upstanding electrode pedestal 13, preferably of cylindrical shape and having an upper flat surface 14 the outer part of which provides an annular electrode surface upon which one of the bellows plates 15 to be welded is adapted to be supported. The cooperating bellows plate, which is adapted to be welded to the plate 15 in the formation of the bellows structure is shown at 16, the manner in which the plates are brought into juxtaposition for the welding of their inner peripheral edges being best shown in Figs. 3 and 4.

Supported on the table 10 by suitable securing means such as a bolt 18 is a bracket 19, the upper end of which carries a fluid operated actuator, such for example as a compressed air actuator, the piston of which operates a reciprocable plunger member 20. In Fig. 1 the compressed air actuator is generally indicated by the numeral 21, being operable by means of a reversing valve 22 operated by a control handle 23. It will be seen that as the handle member is manipulated, the plunger 20 will be raised or lowered by the actuator in respect to the table 10. As best shown in Fig. 3, the lower end of the plunger 20 is adapted to be fixed, as by means of set screws or the like 24, to a plate or ring-like electrode member 25 also providing an annular electrode surface, the electrode being recessed to provide a shoulder against which the end of the plunger may exert its pressure engagement. As diagrammatically shown in Fig. 1, the electrode pedestal 13 and the plunger 20 are connected to the secondary of a welding transformer 26 connected to a suitable source of electric current supply. A circuit control switch is diagrammatically shown at 27, the switch being controlled by an abutment on the plunger, whereby to control the welding current in predetermined timed relation with the movement of the plunger in its downward travel. The arrangement is generally similar to that disclosed in my prior Patent No. 2,293,247, dated August 18, 1942.

It will be seen that as the plunger 20 is lowered, the ring electrode 25 and the pedestal electrode 13, which are constructed of suitable electrode material, will be brought into clamping engagement with the inner peripheral edges 28 and 29 of the plates, and upon the application of the welding current will effect the formation of an electric resistance weld between the engaged plate edges, in a manner now to be more specifically described.

Particular attention is directed to the shaping of the plates 15 and 16. In accordance with the methods of the invention these plates which initially may be flat, will be complementarily profiled into the shape shown in Fig. 3 by suitable means, for example by stamping between profiled die members, not shown. The profiling thus imparted to the plates provides reduced areas of contact between them, along their inner peripheral edges 28 and 29. Further, in profiling the plate 15 the inner peripheral edge 28 of the plate is provided with a reversely bent projection or flange 30 whereby to provide a still further reduced area of contact, or substantially line contact between the plates along their inner peripheral edges, as they are clamped between the welding electrodes. Accordingly a localized area of contact is provided between the plates along a circular margin through which welding current flows, as the current and the welding pressure are applied, thus facilitating the formation of a satisfactory resistance weld between the engaged plate flanges in accordance with the principles of projection welding. As will be understood, the welding heat and relatively light pressure may be first applied to heat the contacting areas to be welded, the heat being reduced as the power actuator then impacts the electrodes to forge the weld.

It will be seen that in accordance with the means and methods provided, a satisfactory projection type resistance weld may be effected between the engaged inner peripheral plate edges, notwithstanding that the diameter of such edges may be relatively small, for example one inch or less, rendering the welding thereof difficult by ordinary methods. As stated, the reversely bent or inturned circular flange 30 provides a further localized area of contact between the plate edges, facilitating the formation of the resistance weld. This inturned flange, inasmuch as it lies directly upon and is supported by the plate edge surface 28, resists deformation or flattening, sufficiently so that it withstands the pressure engagement of the electrodes and the heating effects of the welding current until a satisfactory weld is produced. In other words, the inturned flange will not prematurely flatten out, thus failing to provide its desired function, even though the thickness or gauge of the bellows plates may be extremely thin. The plates, after the welding operation, are shown in Fig. 4, the circular resistance weld produced between the plate edges being indicated by the numeral 32.

In Figs. 5, 6 and 7 alternate means and methods are illustrated for producing substantially line contact along an annular margin of the plate edges to be welded, whereby to facilitate the production of an annular resistance weld. In Fig. 5 the welding electrode ring 25a is provided on its lower face with an annular projection 35 providing substantially line contact along an annular margin between the welding electrode and the edge flange 29a of the plate 16a. Accordingly in this instance the projection 35 provides a limited or restricted path for the welding current between the plate flanges 28a and 29a, the projection 35 thus supplanting and performing the function of the reversely bent flange 30 of the embodiment illustrated in Fig. 3. The profiling of the plates, whereby to provide limited contact along their contacting edges, cooperates with the projection 35 which effects a further limiting of the path for the welding current, whereby to facilitate the production of a satisfactory resistance weld between the plates as indicated at 32. It will be understood that the electrode ring 25a is otherwise similar to the electrode ring 25 previously described, and may be associated with the plunger 20 in the same manner.

In Fig. 6 an embodiment is illustrated, particularly adapted for use where the bellows plates to be welded are of heavier gauge. In this instance one of the plates, for example the plate 15b, is provided, in connection with its profiling, with an annular projected rib 37 providing the substantially line contact between the plate flanges 28b and 29b. As will be understood, during the welding operation the rib 37 will be flattened and the plate edges brought into full contact in the manner illustrated in Fig. 4, as in the case of the annular projection 30 previously described. However, in the case of plates of heavier gauge, the rib 37 may be relied upon to have sufficient rigidity to withstand premature collapse under the welding pressure. As earlier stated, the rib or projection 30 of the embodiment of Fig. 3 is reinforced by its direct bearing upon the plate flange 28, and thus may be relied upon to prevent premature collapse even though used with plates of lighter thickness or gauge.

In Fig. 7 a still further arrangement is shown for providing substantially line contact between the plate flanges 28c and 29c to be welded. In this instance an annular ring 39 is placed between the plate flanges as they are clamped between the welding electrodes, the ring thus providing the initial reduced area of contact between the parts to facilitate the welding operation. As will be understood, the ring may be provided of the same material as the material of the plates, and during the welding operation the ring is collapsed and the plate edges are brought together and welded along a circular margin, as illustrated in Fig. 4.

In Figs. 8–12 means and methods are shown for effecting the welding of the outer marginal edges of the plates, whereby to form the completed bellows structure. The bellows can be built up, if desired, by assembling the plates one by one and welding alternately along the inner and outer marginal contacting plate edges. Preferably, however, pairs of plates are first welded along one set of marginal edges, for example, the inner marginal edges as illustrated in Figs. 1–7, and thereafter the welded pairs are brought into contact and welded along their other peripheral edges, for example their outer peripheral edges as shown in Figs. 8–12.

Referring to Figs. 8 and 9, an apparatus for welding the outer peripheral edges of the plate pairs is illustrated, generally similar to that shown in my aforesaid application, Serial No. 298,235. As shown, the apparatus comprises a split ring electrode comprising a pair of semi-circular support members 41 and 42 pivotally connected together by means of a hinge 43 carried upon a rotatable ring member 44. This ring member is in turn rotatably supported upon a frame member 45 by means of a ball bearing structure 46. The ring 44 carries an annular gear 47 adapted for cooperation with a pinion 48 secured to the end of a driving shaft 49. It will be seen that as the shaft 49 is rotated, the gears 47 and 48 effect rotation of the ring member 44 and of the split electrode support members 41 and 42 carried thereby.

When the split support members are in their dotted line position, as shown in Fig. 9, a bellows structure can be readily introduced into and removed from the apparatus, whereas when the support members are moved into their full line position as shown in Fig. 9 they will cooperatively support the outer flange 51 of the plate 16.

A pair of electrode rollers 52 and 53 mounted on axles 54 and 55, respectively, are rotatably carried by the arms 56 and 57 of a yoke member adapted to be vertically shifted to clamp the plate flanges 51 and 58 as shown in Fig. 8, and also laterally shifted before and after the welding operation so as to facilitate removal and positioning of the parts to be welded. It will be seen that as the support structure 41 and 42 is rotated, and welding current applied thereto and to the electrode rollers 52 and 53, a circular seam resistance weld will be provided as indicated at 59 between the outer engaged plate flanges 51 and 58. As plate pairs which have been previously welded along their inner marginal edges are applied to the apparatus of Figs. 8 and 9, the outer engaged plate edges may be successively welded to provide a bellows structure of any desired length. In most instances the diameter of the plates at their outer contacting edges is sufficiently large so that they may be satisfactorily welded by means illustrated in Figs. 8 and 9.

In Fig. 10 a modified arrangement is illustrated for effecting the welding of the outer plate edges. In this instance the plates as illustrated at 15d and 16d, which have been previously welded along their inner marginal edges, as shown at 32, are shaped so that their outer marginal edges 62 and 63 are brought into overlapping engagement. The thus overlapped marginal plate edges may be welded to produce a circular seam resistance weld 64 therebetween, by means of a pair of cooperating electrode rollers 65 and 66 which cooperate to grip the plate flanges therebetween. It will be seen that as the electrode rollers are rotated, and the welding current applied, the circular seam resistance weld will be produced.

In Figs. 11 and 12 apparatus is illustrated for effecting welding operations at the outer peripheral plate edges, employing the principles utilized in effecting the welding of the inner plate edges as shown in Figs. 1–7. The apparatus of Figs. 11 and 12 will have principal utility in instances wherein the bellows is very small so that the outer plate edges are also of relatively small diameter.

In this instance the apparatus comprises a split ring electrode 41a and 42a similar to the embodiment of Figs. 8 and 9, except that in this instance the split ring support is carried by a non-rotatable ring member 69. Cooperable with this support is an electrode assembly comprising a vertically reciprocable plunger 20a carrying a hinge pin 70 adapted to pivotally support a pair of complementarily semi-circular electrode members 71 and 72, formed on their lower surface with an annular rib 73 similar to the rib 35 previously described. It will be seen that as the outer peripheral plate edges 51 and 58 are cooperatively gripped between the electrode 71—72 and the split electrode 41a—42a, and the welding current applied, a projection type circular resistance weld between the outer engaged peripheral plate flanges will be produced. The apparatus of Figs. 11 and 12 operates substantially upon the principles of the apparatus previously described in reference to Fig. 5. It is obvious that features of Figs. 3, 6 and 7 may be similarly adapted to the welding of the outer plate flanges. The manner in which this would be done is believed to be obvious from what has heretofore been said, and specific description is believed to be unnecessary.

It is obvious that various changes may be made in the specific structural embodiments and method steps set forth for purposes of illustration without departing from the spirit of the invention. The invention is accordingly not to be limited to the embodiments shown, but only as indicated in the following claims.

The invention is hereby claimed as follows:

1. The method of making a bellows of the superposed plate type, comprising profiling a pair of metal plates having inner and outer marginal edges to provide a limited area of contact between the plate edges along the length of the inner annular margin of the plates, further limiting the effective electrical contact between the plates along said annular margin to substantially line contact, clamping the engaged inner plate edges between a pair of cooperative electrodes having annular electrode surfaces, and passing welding current between the electrodes while they are in clamping engagement with the inner plate edges whereby to produce an annular resistance weld between said plate edges along the annular margin thereof, repeating the process upon an additional pair of plates, bringing the outer plate edges of adjacent plates in said plate pairs into superposed relation with the edges extending in the same direction, and welding said latter plate edges to provide a bellows structure.

2. The method of making a bellows of the superposed plate type, comprising profiling a pair of metal plates having inner and outer marginal edges to provide a limited area of contact between the plate edges along the length of the inner annular margin of the plates, further limiting the effective electrical contact between the plates along said annular margin to substantially line contact, clamping the engaged inner plate edges between a pair of cooperative electrodes having annular electrode surfaces, and passing welding current between the electrodes while they are in clamping engagement with the inner plate edges whereby to produce an annular resistance weld between said plate edges along the annular margin thereof, repeating the process upon an additional pair of plates, bringing the outer plate edges of adjacent plates in said plate pairs into superposed relation with the edges extending in opposite directions, and welding said latter plate edges to provide a bellows structure.

3. An apparatus for making a bellows of the superposed plate type, comprising a pedestal electrode having an annular surface adapted to receive and support a profiled plate along one annular margin thereof, a second electrode adapted for cooperation with the pedestal electrode, said second electrode having an annular surface shaped to engage a second profiled plate adapted to be superimposed upon the first plate whereby companion marginal edges of the plates may be clamped between the electrodes, means for axially shifting at least one of the electrodes whereby to effect the clamping of the plate edges, each of said electrodes being formed of a pair of complementarily hinged portions separable to admit the plates therebetween, and means for passing welding current between the electrodes while they are in clamping engagement with the plates whereby to produce an annular resistance weld between the engaged plate edges along an annular plate margin.

4. The method of making a bellows as defined in claim 1, wherein the limited electrical contact is provided by forming an annular projection on one of the plates.

5. The method of making a bellows as defined in claim 1, wherein the limited electrical contact is provided by an annular projection on one of the electrodes.

6. The method of making a bellows as defined in claim 1, wherein the limited electrical contact is provided by a separable annular ring member interposed between the plates.

7. The method of making a bellows as defined in claim 2, wherein the limited electrical contact is provided by forming an annular projection on one of the plates.

8. The method of making a bellows as defined in claim 2, wherein the limited electrical contact is provided by an annular projection on one of the electrodes.

9. The method of making a bellows as defined in claim 2, wherein the limited electrical contact is provided by a separable annular ring member interposed between the plates.

DAVID WENDELL FENTRESS.

REFERENCES CITED

The following references are of record in the file of this patent:

UNITED STATES PATENTS

| Number | Name | Date |
| --- | --- | --- |
| 434,468 | Robb | Aug. 19, 1890 |
| 904,540 | Lachman | Nov. 24, 1908 |
| 1,498,520 | Blackmore | June 17, 1924 |
| 1,821,663 | Murray et al. | Sept. 1, 1931 |
| 1,930,899 | Kollsman | Oct. 17, 1933 |
| 2,086,985 | Mitchell | July 13, 1937 |
| 2,101,156 | Payne | Dec. 7, 1937 |
| 2,141,932 | Payne | Dec. 27, 1938 |
| 2,184,939 | Green | Dec. 26, 1939 |
| 2,277,871 | Mitchell et al. | Mar. 31, 1942 |
| 2,293,247 | Fentress | Aug. 18, 1942 |
| 2,323,985 | Fausek et al. | July 13, 1943 |
| 2,326,296 | Harrison et al. | Aug. 10, 1943 |
| 2,347,185 | Fentress | Apr. 25, 1944 |